No. 821,582. PATENTED MAY 22, 1906.
N. A. CHRISTENSEN.
LUBRICATING MECHANISM.
APPLICATION FILED NOV. 18, 1904.
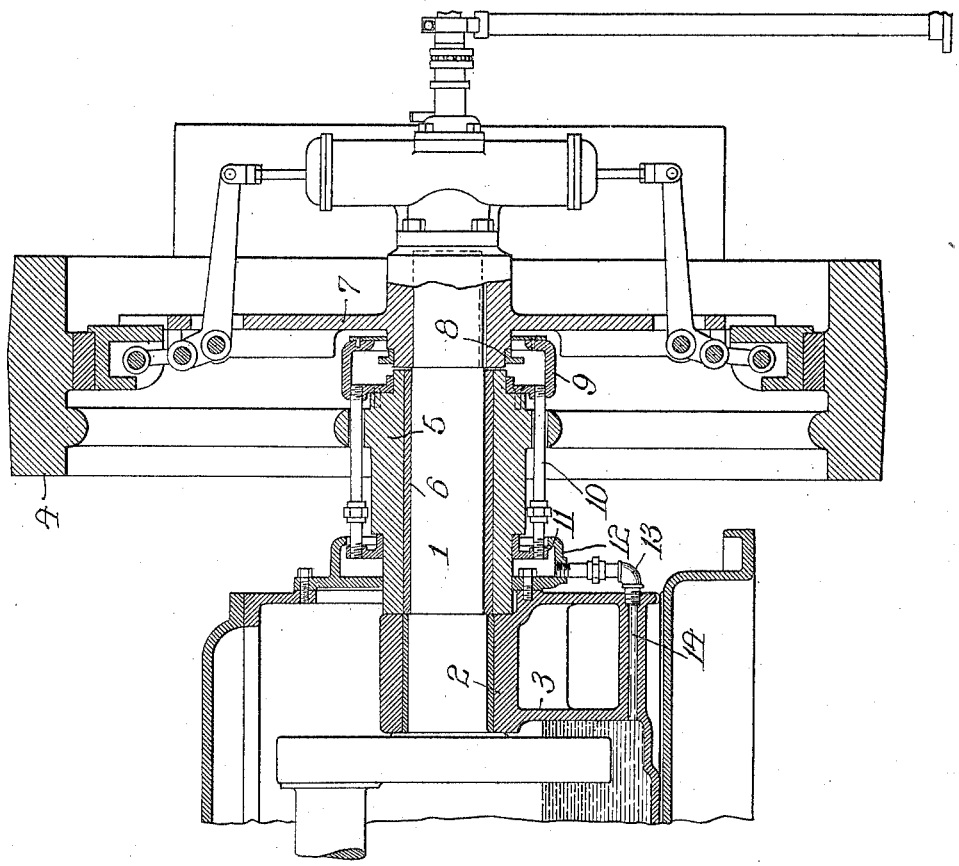
Witnesses:
Harold G. Bautt.
Louis B. Erwin.
Inventor:
Niels Anton Christensen
By Rector & Hibben
His Attorneys

UNITED STATES PATENT OFFICE.

NIELS ANTON CHRISTENSEN, OF MILWAUKEE, WISCONSIN.

LUBRICATING MECHANISM.

No. 821,582.	Specification of Letters Patent.	Patented May 22, 1906.

Original application filed August 21, 1902, Serial No. 120,546. Divided and this application filed November 18, 1904. Serial No. 233,297.

*To all whom it may concern:*

Be it known that I, NIELS ANTON CHRISTENSEN, residing at Milwaukee, Milwaukee county, Wisconsin, have invented certain new and useful Improvements in Lubricating Mechanism, of which the following is a specification.

My invention relates to lubricating mechanism for machines; and in the present instance, for sake of clear and definite description, my invention is shown and described in connection with the driving parts of an air-compressor, for which my lubricating mechanism is admirably adapted.

The object of my invention is to provide simple and efficient means for trapping or collecting the surplus oil from the bearings of a shaft and for draining the same to a suitable place or reservoir, from which it may be automatically fed to the bearings of the machine.

The features of advantage and utility in my lubricating mechanism will be apparent from the description hereinafter given.

The drawing illustrates a section of the driving parts of an air-compressor, showing my invention embodied therein.

While I have for convenience illustrated my invention in connection with an air-compressor and will proceed to describe it in such connection, yet it will be understood that my invention is not limited to such particular use, but that it may have other uses and forms of embodiment. The parts of the compressor herein shown are not here claimed, but made the subject-matter of the original application, filed August 21, 1902, Serial No. 120,546. Hence a detailed description of such parts is unnecessary.

In the present instance the shaft 1 projects through a frame-bearing 2 in a casing 3, and arranged to rotate freely on such shaft is a driving-pulley 4. This pulley has a hub 5, and between it and the shaft is preferably arranged a bushing 6. The clutch-arm 7, which is adapted to be automatically put into or out of engagement with the pulley, is secured in suitable manner to the shaft.

The oil trapping and draining arrangement now to be described and as associated with the above-mentioned parts comprises a series of rings or collars and oil-collecting cups and draining-pipes. A ring or annular projection 8 is formed or fastened on the clutch-arm, with the result that the oil which leaks out along the shaft in the small space between the shaft and the pulley-bearing is thrown off by centrifugal force into an annular receptacle or cup 9. This cup, which is suitably affixed to the pulley-hub 5, so as to be rotatable therewith, comprises a flanged plate having an inturned lip, all so arranged with respect to the ring 8 as to receive and collect the oil thrown from such disk. A suitable number of oil-pipes 10 communicate at their outer ends with the oil-cup 9 and are connected to and pass through a ring or projection 11, also affixed in suitable manner to the hub of the pulley. This ring 11 is arranged to rotate within the plane and confines of a stationary oil receptacle or cup 12, secured to the casing 3. The oil-cup 12 communicates at its lower side with piping 13, connecting, as shown, with an oil-passage 14, arranged in the casing and leading to an oil-well or the like, whence the oil may be again fed to the bearing substantially in the manner shown in my pending application, filed May 8, 1901, Serial No. 59,257, for electric machines and illustrating a direct-connected unit.

In practice the oil escaping from the bearing will pass to the ring 8 instead of dripping down upon the parts beneath or of being thrown outwardly. The oil thus reaching the ring will be thrown by centrifugal force into the oil-cup 9, which collects all such oil and which is for this purpose well within the plane of rotation of the ring 8. From the oil-cup 9 the oil passes transversely of the pulley through the pipe or series of pipes 10, thereby delivering the oil to the inner face of the ring 11, from which the oil is thrown by centrifugal force into the stationary oil cup or receptacle 12. The oil is then drained from the latter oil-cup through drain-pipe 13 and delivered to the oil passage or duct 14, which may lead to an oil well or basin and again automatically be fed to the machine-bearings in the manner above alluded to.

By the employment of my invention the oil, which would otherwise drip upon the machine and become objectionable, is collected and drained away and utilized again and again, thereby attaining cleanliness and economy in operation. Moreover, a continuous and ample circulation of the oil is made possible.

I claim—

1. Oil-trapping mechanism for machines comprising, in combination with a shaft, a rotatable member thereon, a projection or ring thereon, a second rotatable member having an oil-cup arranged in proximity to said ring and receiving oil thrown therefrom, and means for draining the oil from said cup.

2. Oil-trapping mechanism for machines comprising, in combination with a shaft, a rotatable member thereon, a projection or ring on said member, a second rotatable member having an annular oil-cup receiving oil thrown by the ring, and means for draining the oil from said cup while the same is rotating.

3. Oil-trapping mechanism for machines comprising, in combination with a shaft, a rotatable member thereon, a projection or ring on said member, a second rotatable member having an annular oil-cup receiving oil thrown by the ring, and arranged in the plane of rotation of such ring, and means for draining the oil from said cup while the same is rotating.

4. Oil-trapping mechanism for machines comprising, in combination with a shaft, a rotatable member thereon, a projection or ring on said member, a second rotatable member having an annular oil-cup receiving oil thrown by the ring, a second ring arranged on said second member, a connection between said oil-cup and second ring for delivering oil to the latter, and means for collecting oil thrown from such second ring.

5. Oil-trapping mechanism for machines comprising, in combination with a shaft, a rotatable member thereon, a projection or ring on said member, a second rotatable member having an annular oil-cup receiving oil thrown by the ring, a second ring arranged on said second member, a connection between said oil-cup and second ring for delivering oil to the latter, and a stationary oil-receiver for collecting oil thrown from such second ring.

6. Oil-trapping mechanism for machines comprising, in combination with a shaft, a rotatable member thereon, a projection or ring on said member, a second rotatable member having on one side adjacent said ring an annular oil-cup receiving oil thrown from such ring, a second ring on the other side of such second member, pipes extending transversely of such latter member for conducting oil from such oil-cup to the face and edge of such second ring, and a stationary annular oil-cup arranged adjacent such second ring and receiving oil thrown therefrom.

7. Oil-trapping mechanism for the friction-clutch pulley of a compressor comprising, in combination with such pulley, an annular receptacle or cup arranged on the pulley and adapted to catch oil thrown from the bearing, pipes for conducting the oil from such cup, and a stationary receptacle coöperating with such pipes to receive the oil drained through them.

8. Oil-trapping mechanism for the friction-clutch pulley of a compressor comprising, in combination with such pulley, an annular receptacle or cup arranged on the pulley and adapted to catch oil thrown from the bearing, a second but stationary annular receptacle or cup arranged at the opposite side of said pulley, transverse pipes leading from the first cup and emptying into the second cup.

9. Oil-trapping mechanism for the friction-clutch of a compressor comprising, in connection with the driving-shaft and the pulley and clutch-arm arranged therein, a projecting flange or ring arranged on the clutch-arm adjacent the pulley and adapted to receive and throw the oil escaping from the pulley-bearing, an annular cup or receptacle secured to one side of the hub of such pulley and arranged to receive the oil thrown by said ring, a ring 11 secured at the other side of the hub, pipes communicating with said cup and extending transversely of the pulley and there secured to said ring 11, and a stationary oil-receiving annular cup or receptacle arranged to receive oil from said pipes.

10. Oil trapping and draining mechanism for the friction-clutch of a compressor comprising, in connection with the casing of the compressor, its driving-shaft, its pulley and its friction-arm, an annular cup or receptacle on the pulley arranged to receive oil escaping from the pulley-bearing, transverse pipes for conveying such oil from the cup to the other side of the pulley, a stationary cup or receptacle for receiving the oil from said pipes, and a pipe or passage leading from said stationary cup into the compressor-casing.

NIELS ANTON CHRISTENSEN.

Witnesses:
JNO. DADMUN,
BURN SEGERBERG.